Figure 1:
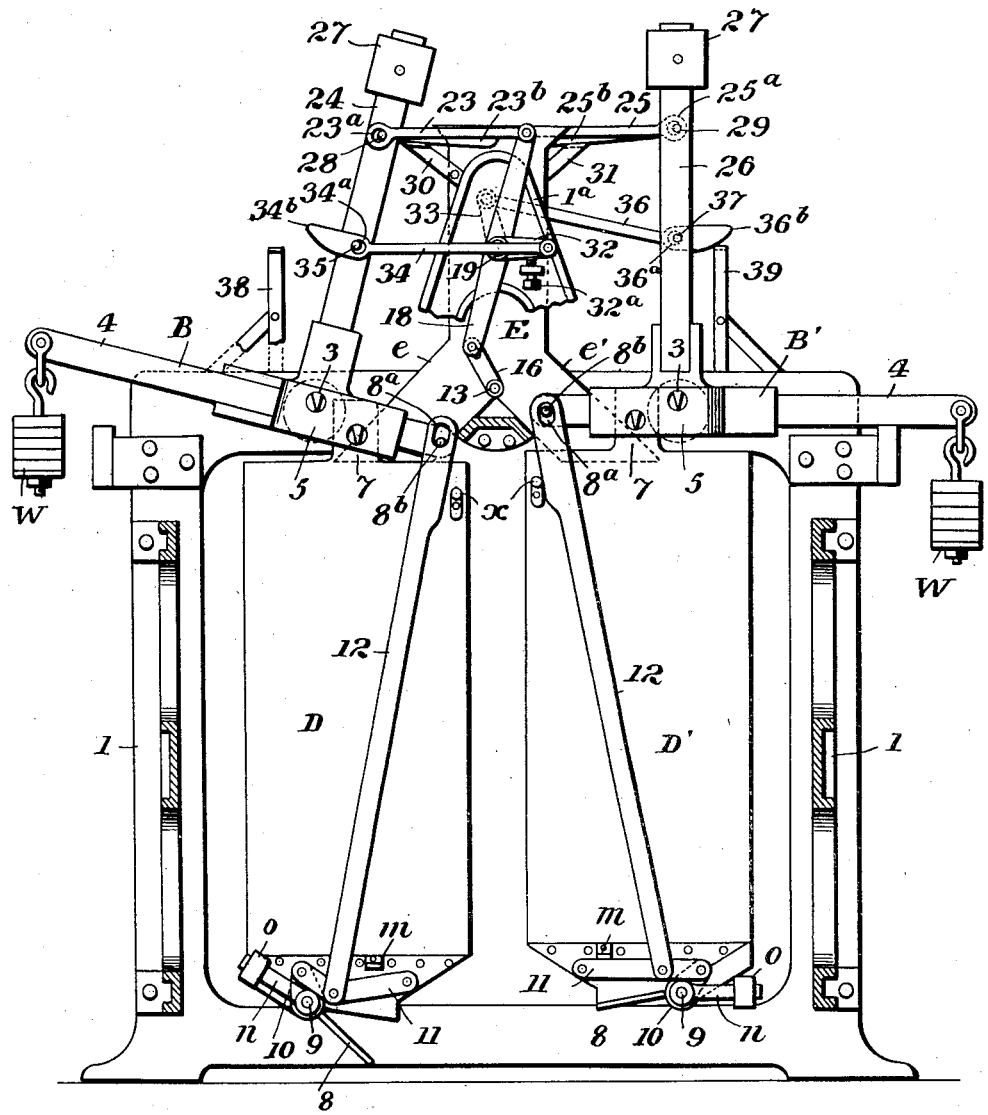

No. 889,281. PATENTED JUNE 2, 1908.
R. D. WEBB.
AUTOMATIC WEIGHING AND DUMPING MACHINE.
APPLICATION FILED OCT. 5, 1907.

2 SHEETS—SHEET 1.

Witnesses
Inventor
Robert D. Webb
Attorneys

No. 889,281. PATENTED JUNE 2, 1908.
R. D. WEBB.
AUTOMATIC WEIGHING AND DUMPING MACHINE.
APPLICATION FILED OCT. 5, 1907.
2 SHEETS—SHEET 2.
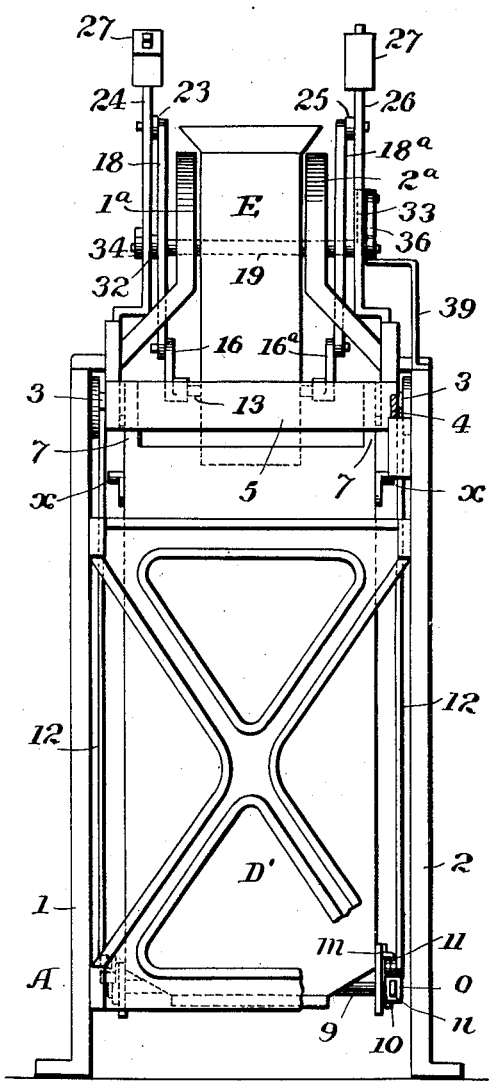
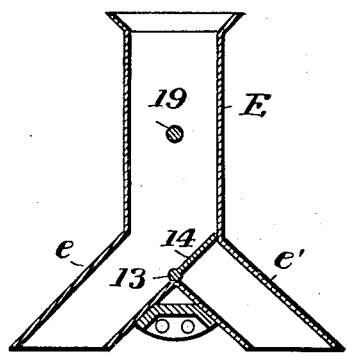
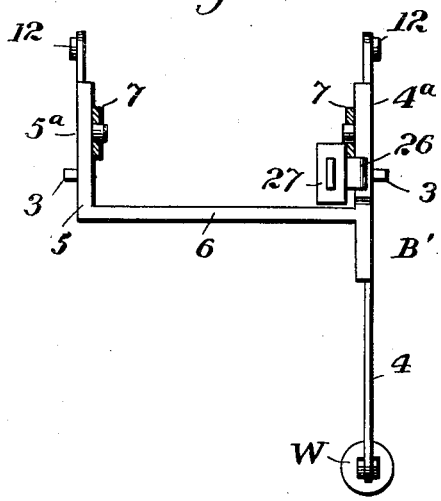

UNITED STATES PATENT OFFICE.

ROBERT D. WEBB, OF MINDEN, LOUISIANA.

AUTOMATIC WEIGHING AND DUMPING MACHINE.

No. 889,281.　　　　Specification of Letters Patent.　　　Patented June 2, 1908.

Application filed October 5, 1907. Serial No. 396,061.

*To all whom it may concern:*

Be it known that I, ROBERT D. WEBB, a citizen of the United States, residing at Minden, Webster parish, Louisiana, have invented certain new and useful Improvements in Automatic Weighing and Dumping Machines, of which the following is a specification.

This invention comprises improvements in automatic weighing and dumping machines wherein a pair of receptacles, attached to a pair of scale beams are automatically and alternately filled with a given weight of grain or other material and dumped, and the purpose of the invention is to provide in such a machine means whereby the scale beam which is in weighing position will be free to move for a given initial distance from said position without being retarded or interfered with by any other part of the mechanism, so that the scale will weigh accurately. After moving said initial distance from its weighing position the rising scale beam releases the other beam of the machine which then aids in the operation of the mechanism.

In the accompanying drawing Figure 1 is a side elevation of the machine, the supporting frame being shown in central vertical section; Fig. 2 is an end elevation of the machine; Fig. 3 is a central vertical section through the feed hopper, and Fig. 4 is a top plan view of one of the scale beams.

Referring to the drawing, A indicates a suitable frame in the upper part of which, between the sides 1 and 2, are mounted scale beams B and B'. A feed chute E is arranged centrally in the upper part of the frame, and the scale beams are pivoted at opposite sides of the chute upon knife-edge bearings 3, which fit into suitable cups in the sides of the frame. The scale beams are alike in construction, each beam, as shown best in Fig. 4, comprising parallel bars 4 and 5, connected by a cross-piece 6, said bars being provided with knife-edge bearings 3 for supporting the beam, and the longer arm 4 carrying adjustable weights $w$. Receptacles D and D' are suspended from the shorter arms of the beams B and B' respectively, said receptacles having ears 7 which are pivotally connected to the beams near the pivotal points or bearings of the beams. Each receptacle has a gate or valve 8 at its lower end which is mounted upon a rock-shaft 9 having cranks 10 at the sides of the receptacle connected to toggle-levers 11. The shafts 9 also carry weighted arms $n$ to normally overbalance and close the gates 8. Links 12 connect the ends of the shorter arms of the scale beam with the toggle-levers as shown, the arrangement being such that when the scale beam is in horizontal position the toggle levers connected thereto will be straightened and the valve or gate will be closed, and when the scale beam is tilted the toggle levers will be flexed and the valve or gate opened. The rods 12 have slots $8^a$ at their upper ends through which pins $8^b$ on the beams extend, and these rods are supported by rests or stops X attached to the receptacles, thus allowing for lost motion between the rods and beams, so that during the initial movement of a beam from its horizontal position it will not be obstructed or retarded by pressure or friction against the rods.

The feed chute E has a valve or gate 14 arranged within the chute and mounted on a rock-shaft 13 which is provided with a crank 16, and said crank is connected to one end of a lever 18, which is journaled at its center upon the rock-shaft 19, the latter being journaled in upward extensions $1^a$ and $2^a$ of the frame and extending through the feed hopper or chute. The rock shaft 13 also has a crank $16^a$ which is connected to the lever $18^a$ arranged parallel with the lever 18 upon the opposite side of the hopper, and journaled upon the rock-shaft 19. When the levers 18 and $18^a$ are rocked in one direction, it will be evident that, through the connections described, the valve 14 will be moved, in one direction and when the levers are rocked in the opposite direction the position of the valve will be reversed, so that, according to the position of the valve, the material to be weighed will be directed into one or the other of the receptacles.

The upper end of the lever 18 is connected by a link 23 to a standard 24 which projects upwardly from the scale beam B, being secured to said beam above its pivotal point, and the upper end of the lever $18^a$ is connected by a link 25 to a standard 26 which is connected to the beam B' above the pivotal point of the latter. Each standard may have a weight 27 at its upper end. The links 23 and 25 are connected to the standards by means permitting a limited amount of play or lost motion between the standards and the links. Thus, the link 23 has a slot $23^a$ through which a pin 28 on the standard extends and the link 25, as shown in dotted lines in Fig. 1, has a similar slot 25ᵃ engaged by a pin 29 upon the standard 26. The link 23 also has a cam-surface 23ᵇ on its under side, which when the standard 24 moves to vertical position, rides onto a fixed support 30, thus raising the slotted end of the lever 23 slightly and taking the weight of said lever off of the pin 28 on the scale beam. Similarly, the line 25 has a cam-surface 25ᵇ on its lower side which rides onto a fixed support 31 when the standard 26 moves from the inclined to the vertical position, thus taking the weight of the link off of the pin 29. When a scale beam is in the horizontal or weighing position, therefore, and the weighted standard poised in the vertical position, the link connecting the lever with the valve mechanism is out of frictional engagement with the standard and does not interfere with the initial movement of the scale beam.

Upon the opposite ends of the rock shaft 19 are arranged cranks 32 and 33, at an angle to one another. A link 34 is pivoted at one end to the crank 32 and the opposite end of the link has a slot 34ᵃ which is engaged by a pin 35 upon the standard 24. Similarly, a link 36, pivoted at one end to the crank 33, has a slot 36ᵃ at its opposite end which is engaged by a pin 37 upon the standard 26. The link 34 is extended beyond the standard 24 and has a cam-surface 34ᵇ which rides up onto a fixed stop 38 when the standard 24 is brought to the vertical position, raising the end of the link off of the pin 35. In the same way, the link 36 has a cam-surface 36ᵇ which rides on to a fixed support 39 when the standard 26 moves into the vertical position, thus raising the link out of frictional engagement with the pin 37.

In Fig. 1 of the drawing, the scale beam B′ is shown in the weighing position and the scale beam B in the discharging position. It will be noted that the scale beam B is held in the inclined position by the link 34 and crank 32, which are substantially in line with one another, or "on center," the crank 32 resting against a stop 32ᵃ. The lever 18, for operating the valve is also held stationary by the link 23 which is connected to the inclined standard 24 and to the lever 18. The valve 8 of the receptacle D is also held open to permit material to discharge from said receptacle, and the valve 8 of the receptacle D′ is maintained closed, to retain material therein. The links 25 and 36, being held out of frictional engagement with the pins on the standard of the scale beam B′, and the rods 12 being also held out of frictional engagement with the pins 8ᵇ on the scale beams, it will be seen that whenever sufficient material has passed into the receptacle D′ to overcome the weights on the beam, the beam will move freely for a short distance, having no friction to overcome other than the friction of the knife-edge bearings 3. After the standard has moved a short distance from its vertical or poised position, and the parts have gained sufficient momentum to move the links 25 and 36 and the mechanism connected therewith, the pins on the standard engage the left hand walls of the slots in said links and force the links to the left in Fig. 1. The link 36 then rocks the crank 33 toward the horizontal position and causes the crank 32 to swing upwardly out of line with the link 34, so that the beam B can swing back into its horizontal position and the link 36 will come into line with the crank 33, locking the standard 26 and scale beam B′ in the inclined positions. While the standard 26 is moving into the inclined position it also rocks the lever 18ᵃ through the medium of the link 25 and the valve mechanism connected with said lever is thereby moved thus moving the valve 14, shutting off the supply of material to the receptacle D′ and admitting material to the receptacle D. As the beam B′ tilts, the rods 12 flex the toggle 11 and open the discharge valve 8 at the bottom of the receptacle D′, dumping the material therein, and as the beam B returns to the horizontal position, the rods 12 and counterweight o connected with the toggle levers 11 on the receptacle D, straighten the toggles against the stops m and close the discharge valve 8 at the bottom of said latter receptacle. It will be evident that when the receptacle D again receives sufficient material to tilt the beam B, said beam will again rock into the position shown in Fig. 1, the initial movement of the beam taking place without being attended by any friction or obstruction from the mechanism, which it starts to operate after it has gained some momentum. Thus, the two beams will operate alternately and weigh as accurately as any ordinary scale. As each standard moves from the inclined to the vertical position, the links connected therewith ride on to the fixed stops and thus hold the links out of frictional engagement with the standards, while the beams are in the weighing positions, and as each beam comes into horizontal weighing position the rods 12 respectively ride on stops x and are thus held out of frictional engagement with the beams while they are in weighing position. The slots in the upper ends of rods 12 being sufficiently large to allow for vibration in the receptacle being filled. The stops x may be provided with rollers to engage rods 12 in order to reduce the friction at this point, if desired.

The object of this invention is to permit the scale beam to move to a certain extent from the weighing position freely, that is, without encountering any obstruction or friction, in order that the apparatus may weigh with great accuracy. After the scale begins to tip the weight 27 will become effective to assist in operating the mechanism and will assist in supplying the power necessary to break the toggle 11 and open the valve or gate 8.

Without limiting myself to the specific design and arrangement of parts shown and described, what I claim and desire to secure by Letters Patent is, 1. The combination with the scale beams of an automatic weighing and dumping machine, of a receptacle supported by each scale beam and provided with a movable gate or valve, a toggle connecting the gate or valve to the receptacle, and a connection between the toggle and the scale beam, said connection being constructed to permit the scale beam to move slightly without disturbing the toggle when the valve or gate is closed.

2. The combination with the scale beams of an automatic weighing and dumping machine, of a receptacle supported by each scale beam and provided with a movable gate or valve, a toggle connecting the gate or valve to the receptacle, and a link connecting the toggle and the scale beam, the connection between the link and one of said parts being arranged to provide for lost motion.

3. The combination with the scale beams of an automatic weighing and dumping machine, of a receptacle supported by each scale beam and provided with a movable gate or valve, a toggle connecting the gate or valve to the receptacle, and a link connecting the toggle and the scale beam, said link having a pivotal connection with one of said parts and a pin-and-slot connection with the other.

4. The combination with the scale beam of an automatic weighing and dumping machine, of a receptacle supported by the scale beam, a discharge gate or valve for the receptacle, and connections between the gate or valve and the scale beam whereby the former is operated by the latter, the said connections being constructed to permit the scale beam to move independently before finally operating the gate or valve.

5. The combination with the scale beam of an automatic weighing and dumping machine, of a receptacle supported by the scale beam, a discharge gate or valve for the receptacle, and connections between the gate or valve and the scale beam whereby the former is operated by the latter, the said connections being constructed to permit the scale beam to move from its weighing position before the opening movement of the gate or valve begins.

6. In an automatic weighing and dumping machine, the combination of the scale beams, receptacles supported by each beam, a discharge gate or valve for each receptacle, lost motion connections between the gates or valves and the scale beams, and means for holding said connections out of frictional engagement with the scale beams respectively while said beams are in weighing position.

7. In an automatic weighing and dumping machine, the combination of the scale beams with standards projecting therefrom, and mechanism loosely connecting said standards whereby each standard is alternately locked in fixed position as the receptacles connected with the scale beams are alternately filled, and discharge valves connected to the receptacles and mechanism loosely connecting said valves to the scale beams whereby each valve is alternately locked in fixed position as the receptacles are alternately filled and discharged.

8. In an automatic weighing and dumping machine, the combination of the scale beams with standards projecting therefrom, and mechanism loosely connecting said standards whereby each standard is alternately locked in fixed position as the receptacles connected with the scale beams are alternately filled, and discharge valves connected to the receptacles and mechanism loosely connecting said valves to the scale beams whereby each valve is alternately locked in fixed position as the receptacles are alternately filled and discharged, and means for holding said mechanisms respectively and alternately out of frictional engagement with the standards and the scale beams when the said scale beams are in weighing position.

In testimony whereof I affix my signature in presence of two witnesses.

ROBT. D. WEBB.

Witnesses:
S. F. MARTIN,
N. R. GRIGSBY.